Feb. 18, 1936.  H. J. CRINER  2,031,252

PROCESS OF SLICING BREAD

Filed Feb. 16, 1931

INVENTOR
Harry J. Criner
BY
ATTORNEY

Patented Feb. 18, 1936

2,031,252

UNITED STATES PATENT OFFICE 2,031,252

PROCESS OF SLICING BREAD

Harry J. Criner, Davenport, Iowa, assignor, by mesne assignments, to The Micro Corporation, Bettendorf, Iowa, a corporation of Delaware Application February 16, 1931, Serial No. 516,066

10 Claims. (Cl. 99—10)

This invention is a continuation in part of my copending application Serial No. 436,143 filed March 15, 1930, which in turn is a division of my copending application Serial No. 375,132 filed July 1, 1929, and relates to a method of slicing loaves of bread, cake, and similar baked products, and to a baked product package.

One of the objects of the present invention is to provide a method of slicing baked products such as bread, whereby the baked product after slicing will retain its original un-sliced shape.

Another object is to provide a method of slicing baked products whereby the resulting slices of the baked product will be connected together by narrow un-cut portions of the product.

Another object is to provide a method of slicing a loaf of bread wherein the same is completely sliced with the exception of a narrow un-sliced portion connecting the adjacent slices, so that the product will retain its original un-sliced position.

Another object is to provide a method of slicing a loaf of bread wherein the loaf is completely severed with the exception of a narrow portion thereof connecting the adjacent slices through the intermediate portion of the loaf, whereby the slices can be readily broken apart before use.

Another object is to provide a method of slicing a loaf of bread wherein after slicing the individual slices will be caused during shrinkage to very closely lie against each other to prevent drying out of the same.

Another object of the invention is to provide a baked product wherein the same is divided into a plurality of slices and wherein the slices are connected together by narrow portions of the product extending centrally through the same.

Another object is to provide a baked product comprising a plurality of individual slices which are sliced in such a manner that during shrinkage of the loaf the slices will be automatically held closely against each other to prevent subsequent drying out of the same.

With the above and other objects in view which will be apparent from the detailed following description, the present invention consists in a certain procedure of slicing which will be readily understood by those skilled in the art to which the invention appertains.

In the accompanying drawing.

Figure 1:
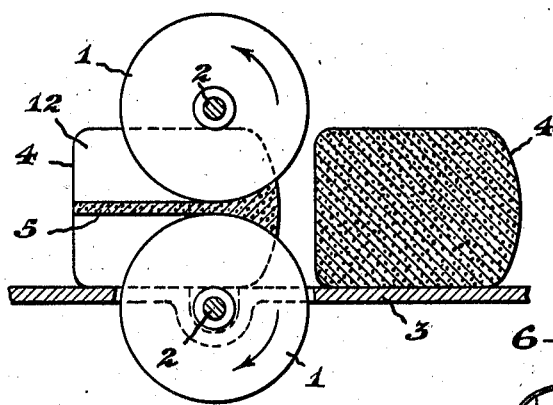
Figure 1 illustrates a pair of rotary cutters in the process of slicing a baked product such as bread in such a manner that the individual slices are connected by a centrally positioned narrow portion of the baked product.

Heretofore it has been the practice in the commercial slicing of baked products, such as bread, to completely sever the individual slices in a single slicing operation and to assemble the slices in their original un-sliced relation in some sort of a retaining tray or band, and then to wrap the sliced product and the retaining means within a suitable wrapper.

There are many disadvantageous features arising out of this particular procedure, especially when used in connection with sliced bread. It has been found that when the wrapper is removed, such as in the home, and several slices removed, that the slices dry out in a relatively short time because it is impossible to hold the slices in close enough adjacent relationship, since they have a tendency to slide away from each other when positioned in a tray, and furthermore since in many cases the wrapper is torn and it is impossible to re-wrap the product after the slices are removed.

It is the purpose of this invention to overcome these disadvantageous features by providing a method of slicing wherein the slices are connected with each other by means of a narrow un-cut portion of the product extending centrally through the same, this portion being of sufficient thinness that each slice can be quickly and easily broken away from the next adjacent slice in a very smooth manner.

Baked products, such as bread, are commercially sliced in a single operation usually before the bread has completely cooled, with the result that considerable shrinkage occurs after slicing. With my invention which embodies the slicing of the bread in such a manner that each slice is connected to the next adjacent slice by a narrow un-cut portion extending centrally through the same, the shrinkage of the uncut portion draws the slices in very closely contacting relationship, with the result that the kerfs are closed in, which prevents the admission of air to the sliced surfaces and thereby permits the slices to retain their freshness for a much greater length of time.

The advantages of my invention, therefore, are many fold. One of these advantages is that when the product leaves the slicing machine each slice is connected to the next adjacent slice, which holds the loaf in a completely assembled shape and permits easy handling of the same during the subsequent wrapping operation, and furthermore, eliminates the use of retaining trays, bands, and other retaining devices.

Another advantage is that when the wrapper is removed, such as takes place in the home, each slice as needed can be easily removed without disturbing the position of the other slices which will still remain in their closely contacting relationship, thus lessening the liability of exposure of the cut surfaces to the air.

Another advantage is that the cost of commercially slicing bread is materially reduced by the elimination of retaining means, such as bands and trays, with the result that the public can purchase uniformly sliced bread for substantially the same price as un-sliced bread.

A further advantage is that the care heretofore used in re-wrapping the sliced bread when slices are removed can be obviated. This is particularly true with children, who do not use extreme care in re-wrapping a sliced loaf of bread after they have removed slices from the loaf. With the present invention children can remove slices without the danger of the retaining slices being disarranged so that they may subsequently dry out.

In the accompanying drawing in which like numerals refer to like parts throughout the several views, it will be noted that the baked product may be sliced in different manners in accordance with my invention.

Figure 5:
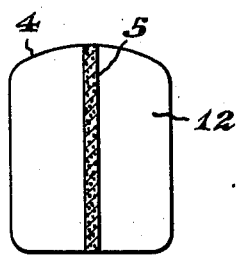
Fig. 5 is a section taken on the line 5—5 of Fig. 4.

Referring to Fig. 1, I have shown the use of a plurality of solid rotary cutters 1 mounted upon spaced rotary shafts 2. These cutters are mounted in series and are arranged with their cutting edges a short distance apart, as shown, so that they will operate with a slight clearance. A suitable table 3 is provided for the feeding of the product to be sliced to the cutters 1. This table 3 is so arranged that when the articles 4 are being fed to the cutters 1, a narrow un-cut portion 5 will be provided centrally throughout the article. As shown in Figs. 1 and 5, this narrow un-cut portion 5 extends between the slices from the top to the bottom of the loaf 4, and is disposed centrally of the same.

Figure 3:
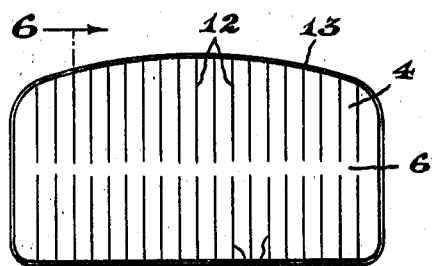
Fig. 3 is a side elevation showing a loaf of bread sliced in accordance with my invention and enclosed within a suitable wrapper.
Figure 6:
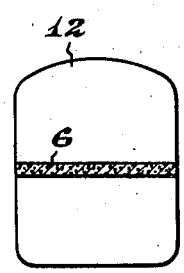
Fig. 6 is a section taken substantially on the line 6—6 of Fig. 3.

This same condition can be reached by changing the position of the article on the table 3 so that a narrow un-cut portion 6 will be provided substantially midway between the top and bottom of the product and extending transversely of the same between the adjacent cut slices substantially as shown in Figs. 3 and 6.

Figure 2:
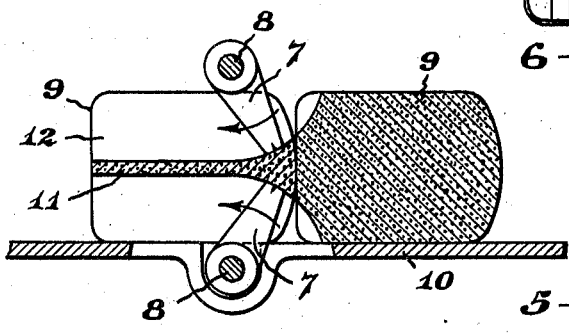
Fig. 2 illustrates a modified type of slicing mechanism used to slice a loaf of bread in such a manner that the slices are interconnected by a central portion.

As shown in Fig. 2, the same effect can be obtained by the use of a plurality of cutters 7 mounted upon the spaced shafts 8 and having their edges arranged to function with the necessary clearance to provide the un-cut portion. In this construction in a manner similar to Fig. 1, the articles 9 being sliced are fed through the cutters on a suitable table 10 in such a manner that the narrow un-cut portion between the adjacent slices will extend centrally of the same, regardless of whether the product is sliced on its side or on its bottom surface.

Figure 4:
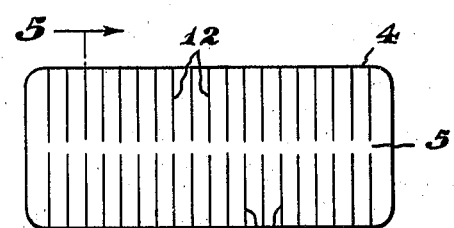
Fig. 4 is a plan view of a baked product loaf sliced in accordance with my invention wherein the slices are connected by narrow portions extending centrally from the top to the bottom of the product.

It will be noted in Figs. 3 and 4 that the completely sliced products will have their slices in substantially the original loaf form, Fig. 3 showing the appearance of the loaf when the un-cut portion extends transversely of the loaf, and Fig. 4 showing the appearance of the loaf when the un-cut portion extends vertically of the same. The kerf 12 between the slices is substantially closed in during the slicing operation, with the result that drying out of the cut surfaces is substantially retarded.

After the bread is sliced it is desirable to immediately wrap the same in a suitable air and moisture-proof wrapper 13 such as waxed paper, shown in Fig. 3, which will coact with the un-cut portions of the loaf to assist in the retention of the loaf in its original un-sliced position. As is well known, the waxed paper will help retain the moisture within the loaf until the loaf is used.

It is desirable in slicing the bread to feed the bottom of the loaf to the cutter first since the bottom of the loaf usually has a considerably harder crust than the top of the loaf, with the result that there will be less crushing of the loaf than if sliced side first. It is obvious that when the side of the loaf is cut first the lower cutter will have to operate against the stiff bottom crust while the upper cutter will have to operate against the upper lighter crust, and the difference in toughness between the two crusts will have a tendency to interfere with the accurate action of the slicing means.

In the use of the slicing machine having rotary cutters such as illustrated, very thin cutters may be used, and by the use of such cutters the faces of the adjacent slices will not be forced apart any appreciable distance, because of the natural resiliency of the fresh bread for which this process is primarily intended, will be such as to take up the space through which the cutters pass as soon as the loaves have passed through the cutters. This also helps after the bread is sliced by reason of the fact that during shrinkage the un-cut portions have a tendency to draw the slices into more closely contacting relationship with the result that drying out of the same is retarded.

The thickness of the un-cut portions of the loaf extending centrally between the slices may be varied to suit the requirements of particular cases. As illustrated in the drawing, the thickness of the un-cut portions is exaggerated to clearly illustrate the same. In ordinary practice it is preferred to leave the un-cut portions from ⅛ to ¼ of an inch in thickness. In some instances, however, the un-cut portions may be made very thin through the central part of the loaf, and of slightly greater thickness at the crust of the loaf. It will be noted that by use of my invention, the narrow portion extending centrally through the loaf between the slices is of uniform thickness, and is of such a small thickness that when the loaves are severed it will be impossible to observe where the slices were removed from the next adjacent slices.

As a result of carrying out the slicing of baked products in accordance with my invention, the sliced product retains its original condition,— that is, the slices remain in contiguous relationship and of the original contour of the un-sliced loaf, each slice being connected to the next adjacent slice. This eliminates the use of the different types of retaining means used heretofore, and by the elimination of such retaining means the product can be sliced more economically and sold to the public at a lower price. The baked product of my invention can be more easily handled during the wrapping operation and during delivery without danger of the slices becoming disarranged with respect to each other.

One of the most important features of this invention is that during shrinkage of the loaf the un-cut portions draw the slices into more closely contacting relationship with each other, with the result that they are prevented from subsequent rapid drying out.

Aside from the specific embodiments of the invention herein shown and described, it will be understood that numerous changes may be made without departing from the spirit of the invention. I do not desire to limit the invention to the exact procedure set forth, as I desire to claim the invention broadly as well as specifically as indicated in the appended claims.

What I claim is:

1. A baked loaf of bread having a plurality of slicing cuts extending inwardly toward the interior from opposite sides thereof and having relatively narrow uncut portions extending substantially from crust to crust between the opposed slicing cuts in such position as to maintain the crustless surfaces of the individual slices in close relationship, whereby the endmost slices may be singly and progressively removed by breaking the uncut portions without disturbing the relative positions of the other slices.

2. A baked loaf of bread having a plurality of uniformly spaced slicing cuts extending in from opposite sides thereof and having relatively narrow uncut portions between the opposed slicing cuts in the central zone of the loaf in such position as to maintain the crustless surfaces of the individual slices in close relationship, whereby the endmost slices may be singly and progressively removed by breaking the uncut portions without disturbing the relative positions of the other slices.

3. A baked loaf of bread having a plurality of relatively uniformly spaced slicing cuts extending in from opposite sides thereof, and having relatively narrow uncut portions extending inwardly from opposed crusts between opposed slicing cuts, said uncut portions being in the central zone of the loaf whereby to maintain the same as a loaf unit with the individual slices in closely abutting relation throughout their areas.

4. A baked loaf of bread having a plurality of slicing cuts extending inwardly toward the interior from opposite sides thereof and having relatively narrow uncut portions extending substantially from crust to crust between the opposed slicing cuts in such position as to maintain the crustles surfaces of the individual slices in close relationship, whereby the endmost slices may be singly and progressively removed by breaking the uncut portions without disturbing the relative positions of the other slices, said uncut portions being of substantially uniform thickness throughout their extent.

5. The method of slicing a loaf of bread which consists in forming a plurality of opposed slicing cuts in opposite sides thereof and extending to the central zone of the loaf and leaving narrow uncut portions in said central zone between opposed slicing cuts to integrally tie the adjacent slices together.

6. The method of commercially slicing a baked loaf of bread which consists in forming a plurality of slicing cuts in each side thereof in alignment with each other and leaving between oppposed cuts in the central zone of the loaf relatively narrow uncut portions extending from crust to crust to tie the slices together and maintain the same in substantially presliced form.

7. The method of slicing a loaf of bread which consists in cutting tranversely into said loaf from opposite sides and substantially to the central zone thereof and leaving narrow uncut portions extending inwardly from the opposite sides thereof integrally tying adjacent slices together, thereby providing an uncut portion extending from end to end of the loaf throughout the central zone thereof.

8. A baked loaf of bread having a plurality of opposed slicing cuts extending from opposite sides inwardly to the central zone thereof and having narrow uncut frangible portions between the opposed slicing cuts and extending inwardly from the crusts of the other opposite sides thereof in such position as to hold the cut crustless surfaces in substantially abutting relation, whereby to hold the cut loaf in loaf form during subsequent handling and whereby the slices may be singly and progressively removed by rupturing the narrow uncut portions without disturbing the relative positions of the other slices.

9. A loaf of bread having slicing cuts extending in from opposite sides thereof, said article having uncut portions to lightly maintain the article as a unit, said unit being enclosed in a wrapper, the said uncut portions being disposed in such positions as to maintain the individual slices in close relationship throughout their areas.

10. The method of preserving bread in a form convenient for users, consisting in tranversely cutting a loaf in from opposite sides to an incomplete extent leaving uncut portions in line with said transverse cuts, and then enclosing the cut loaf in a wrapper.

HARRY J. CRINER.